UNITED STATES PATENT OFFICE.

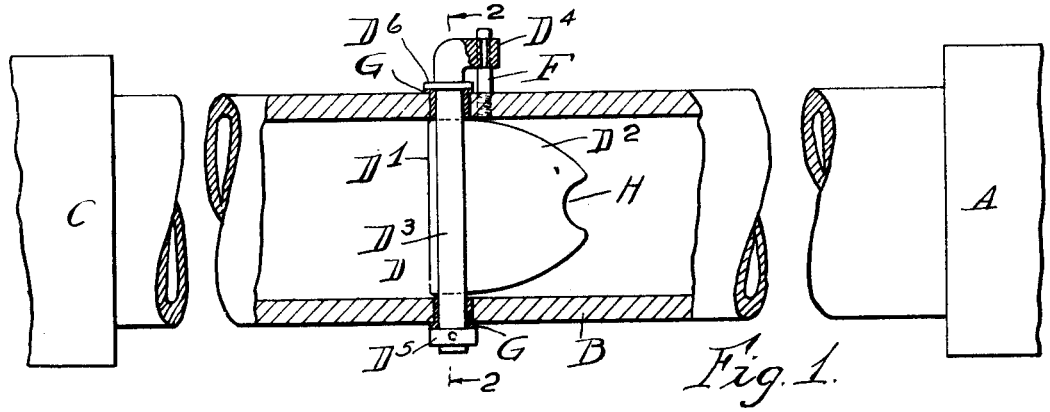
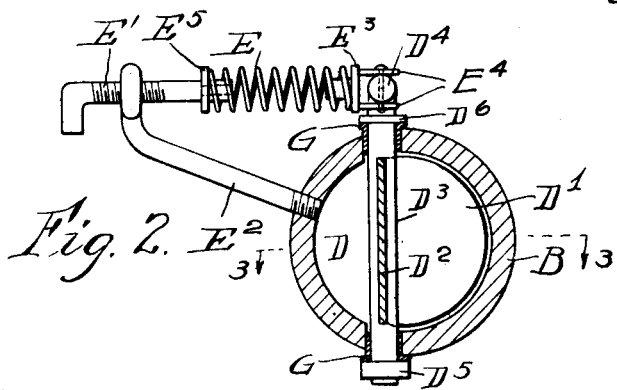
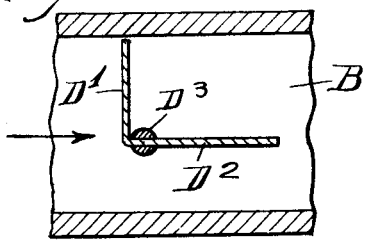
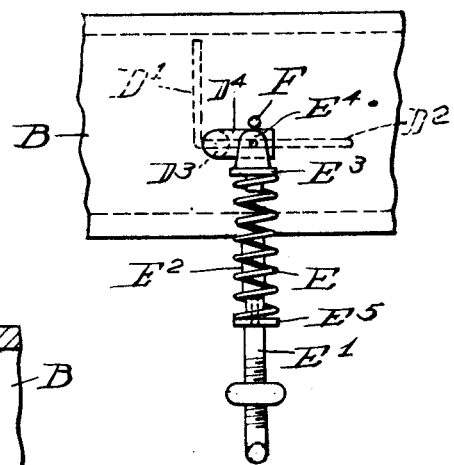
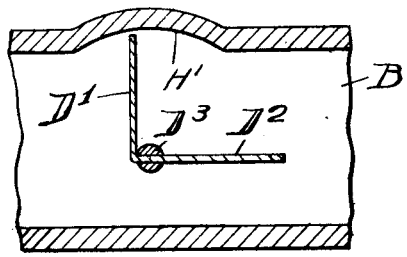

SAMUEL E. KURTZ, OF ODEBOLT, IOWA.

AUTOMATIC GOVERNING-VALVE.

1,105,280.　　　　Specification of Letters Patent.　　Patented July 28, 1914.

Application filed July 9, 1909. Serial No. 506,757.

*To all whom it may concern:*

Be it known that I, SAMUEL E. KURTZ, a citizen of the United States, residing at Odebolt, in the county of Sac and State of Iowa, have invented a certain new and useful Improvement in Automatic Governing-Valves, of which the following is a specification.

My invention relates to a device for automatically throttling the flow of fluids through a conduit. One important feature is the utilization of differential pressures on the two sides of the valve to regulate the flow.

I have illustrated my invention in connection with a gas engine.

Figure 1 shows the device in partly longitudinal section; Fig. 2 is a part section on the line 2—2 of Fig. 1 looking in the opposite direction from the direction of flow; Fig. 3 is a cross section on the line 3—3 of Fig. 2. Fig. 4 is a plan view of my governing valve. Fig. 5 is a section similar to that shown in Fig. 3 in a modified form.

A is the engine, B the supply pipe, C the carbureter. The regulator valve D consists of the wings $D^1$ and $D^2$ mounted on the shaft $D^3$. The wing $D^1$ is made of such shape and size as to completely close the space between the wall of the pipe and the shaft or valve stem when in a plane at right angles to the pipe. The wing $D^2$ of small effective area is adapted to close the space upon the other side of the stem while still at an angle with the above plane. The shaft $D^3$ is mounted eccentrically in the pipe and is supported by the stuffing boxes G and held from endwise movement by the collars $D^5$ and $D^6$. The crank $D^4$ engages the collar $E^3$ by means of the lugs $E^4$. The spring E abuts at one end on the collar $E^5$ which is in rotatable engagement with the screw $E^1$ and abuts at the other end on the collar $E^3$ in such manner that compression of the spring acting against the crank $D^4$ may be adjusted by means of the screw $E^1$. A stop F engages the crank $D^4$ to limit its motion in the opening direction. The opening or slot H in the wing $D^2$ which is located in that part of the wing farthest removed from the pivotal point, is adapted to permit the passage of gas through the conduit, thus preventing the formation of a gas tight closure when the wing is in contact with the wall of the conduit.

The use and operation of my device is as follows: The projected area of the wing $D^1$ on a plane perpendicular to the pipe is larger than that of $D^2$. Supposing the gas to be traveling in the direction of the arrow in Fig. 3 the total pressure upon the surface $D^1$ will be greater than that upon $D^2$. The valve will therefore rotate until $B^2$ is forced upon the wall of the pipe thus substantially closing the opening upon that side of the shaft and leaving a small opening upon the other side which was originally entirely closed by $D^1$. This rotation is opposed by the spring E which may be adjusted for any desired pressure. By adjusting the compression exerted by the spring the governor may be made to regulate the supply of fluid at any desired velocity, since the throttle is dependent upon and responsive to the difference in the pressure upon the two sides of the valve.

A spring is used in connection with the rotating shaft rather than a weight because of the extreme sensitiveness of a spring. The great moment of inertia of a weight effectually prevents its use in connection with such a valve as this one.

In the specification I have spoken of the effective area of the valve wings. It will be evident that this effective area comprises a projection upon a plane perpendicular to the direction of motion through the valve, of the valve leaf, and since this valve leaf rotates about an axis in the same plane, the effective area will vary from zero when the valve leaf is perpendicular to the plane, to a maximum when it is parallel with it.

In the modified form shown in Fig. 5 the pipe or conduit B is provided with a bulge $H^1$, the center about which the inner surface is drawn being substantially the same as the rotational center of the valve, so that the valve leaf $D^1$ as it travels across the surface of said bulge will maintain a fixed relation to the wall of the pipe.

I claim:

1. A regulator valve comprising a passage, a shaft eccentrically mounted therein and having an angular butterfly valve thereon, said valve having wings of different areas.

2. A regulator valve comprising a passage, an angular butterfly valve located eccentrically therein having wings of different actual and different effective areas.

3. A regulator valve comprising a passage, a shaft eccentrically mounted therein and having an angular butterfly valve therein, said valve having wings of different areas, one of said wings being slotted on the side farthest removed from the pivoted point.

4. A regulator valve comprising a passage, a shaft mounted therein having an angular butterfly valve thereon, said valve having wings of different areas and means for preventing the complete closure of one side of the passage of one of said wings.

5. A regulator valve comprising a passage, a shaft mounted therein having an angular butterfly valve thereon, said valve having wings of different effective areas and means for preventing the complete closure of said passage by said valve.

6. A regulator valve comprising a passage, an angular butterfly valve located eccentrically thereon and having wings of different effective and actual areas, said effective areas varying in relation one to the other in response to the angular position of the valve.

7. A regulator valve comprising a passage, a shaft mounted therein having an angular butterfly valve thereon, said valve having wings of different areas and means for preventing the complete closure of said passage by said valve.

SAMUEL E. KURTZ.

Witnesses:
EDNA K. REYNOLDS,
SOPHIE B. WEINER.